United States Patent [19]

EerNisse

[11] Patent Number: 4,550,610
[45] Date of Patent: Nov. 5, 1985

[54] RESONATOR PRESSURE TRANSDUCER

[75] Inventor: Errol P. EerNisse, Sandy, Utah

[73] Assignee: Quartztronics, Inc., Salt Lake City, Utah

[21] Appl. No.: 555,822

[22] Filed: Nov. 28, 1983

[51] Int. Cl.⁴ .......................... G01L 9/08; H01V 7/00
[52] U.S. Cl. ........................................ 73/702; 310/338
[58] Field of Search ................... 73/40.5 A, 702, 151, 73/115, 32 A, 703; 310/338, 344

[56] References Cited

U.S. PATENT DOCUMENTS 3,561,832 2/1971 Karrer et al. ...................... 310/344
3,617,780 11/1971 Benjaminson ...................... 310/344

FOREIGN PATENT DOCUMENTS 0726450 4/1980 U.S.S.R. ................................ 73/702

Primary Examiner—Donald O. Woodiel
Attorney, Agent, or Firm—Thorpe, North & Western

[57] ABSTRACT

A quartz resonator pressure transducer includes a generally disc-shaped resonator section, a housing surrounding the resonator section and joined to the perimeter thereof, with the walls of the housing extending in opposite directions generally normal to the plane of the resonator section. Selected portions of the sidewalls are made thinner than the remaining sidewall portions so that when the housing is immersed in a fluid, a non-uniform stress will be produced in the resonator section. The housing and resonator section are formed so that the frequency of vibration of the resonator section is substantially independent of temperature and relatively independent of temperature transients.

19 Claims, 4 Drawing Figures

RESONATOR PRESSURE TRANSDUCER

BACKGROUND OF THE INVENTION

This invention relates to a crystal resonator used for measuring pressure in fluids.

It is necessary or desirable to measure pressure in a variety of physical environments. One of the most caustic environments in which pressure measurement is necessary is that of deep oil and gas wells. One of the present techniques used in measuring pressure in such environments involves the use of a quartz crystal transducer apparatus which includes a circular resonator section peripherally supported within a hollow, cylindrical housing formed as an integral part of the resonator section. See. U.S. Pat. Nos. 3,617,780 and 3,561,832. The resonator section of such apparatus is caused to vibrate by oscillatory electrical signals applied to electrodes placed on the resonator section. The frequency of vibration of the resonator section varies with variation in radially directed stresses in the resonator section caused by pressure on the housing. Variation in the frequency of vibration of the resonator section thus affords a measure of the pressure to which the housing is subjected.

One of the problems in using apparatus such as that described above for measuring pressure is so-called thermal shock. This arises because the output frequency of the resonator shifts as a result of temperature changes, but more particularly as a result of rapid temperature change, referred to as temperature transients. When the apparatus is used to measure pressure in oil and gas wells, there can be significant temperature changes as the apparatus is lowered into and brought back up from the well, and since the change in frequency of vibration is used to measure the pressure, temperature-caused errors occur. The temperature transient effects on the resonator section are caused by temperature gradients which produce radially directed stresses. These temperature gradients result from the flow of heat into both the resonator section housing and into the resonator section from the metal electrodes coating the surfaces of the section.

Another problem with the presently used quartz resonator transducers is that the scale factor (frequency versus pressure slope) is also temperature dependent. In order to compensate for the temperature-induced errors, it is necessary to provide a temperature measurement which can be used to correct the frequency output. However, such temperature measurements must be taken some distance away from the location of the quartz resonator transducer, and so accurate temperature measurements at the location of the transducer are difficult.

It has been found that by appropriate orientation of the crystallographic axes of the quartz resonator transducer, in particular SC-cut quartz crystals, the output frequency of the transducer can be made temperature transient independent. In effect, the frequency of the quartz resonator is made independent and immune from uniform radially directed stresses caused by temperature gradients. However, in the process of eliminating the effects of temperature transients, the ability to measure uniform, radially directed stresses caused by pressures on the transducer housing is also eliminated in prior art devices.

In U.S. Pat. No. 3,561,832, it is suggested that slots be selectively located between the periphery of the resonator section and the shell or housing—in effect, that the resonator section be held in place by tabs extending between the section and the housing. By using two axially displaced resonator sections held in place in this fashion, it is felt that the temperature-dependent properties of the sections can be cancelled out. However, using this configuration for measuring high pressures would result in high stress concentration at the tabs and possible cracking. Also, the configuration is more complicated in design and construction and this, in turn, would likely reduce reliability.

SUMMARY OF THE INVENTION

It is an object of the invention to provide a resonator pressure transducer capable of accurately measuring pressures in caustic environments.

It is also an object of the invention to provide such a transducer which is substantially independent of temperature transients.

It is another object of the invention to provide such a transducer whose scale factor is substantially temperature independent.

It is still another object of the invention to provide such a transducer which is simple in design and construction, and relatively easy to manufacture.

The above and other objects of the invention are realized in a specific illustrative embodiment which includes a generally disc-shaped resonator section, and a housing surrounding the resonator section and joined to the perimeter thereof. The housing has sidewalls which extend generally normal to the plane of the resonator section, with at least one selected portion of the sidewalls being thinner than the remaining portions so that when the housing is immersed in a fluid, a nonuniform stress is produced in the resonator section. This nonuniform stress is made up in general of a nonuniform radial stress and a nonuniform tangential stress. Either stress component causes a change in resonant frequency of the resonator section. The location and symmetry of the selected thinner wall sections of the housing determine the stress pattern in the resonator section. By appropriate placement of the thinner wall sections, scale factor dependence on temperature can be reduced. Also included is circuitry for causing the resonator section to vibrate, where the frequency of vibration varies with variation in force applied to the housing sidewalls.

In accordance with one aspect of the invention, the resonator section is formed of quartz in a manner such that the frequency of vibration is substantially independent of temperature transients. Primarily, this involves use of SC-cut quartz crystals. There are also a number of different housing configurations which can be used to provide thinner sidewall portions in the housing, including a generally cylindrical housing with flat sections formed coincident with the thinner sidewalls.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

The resonator pressure transducer of the present invention uses a non-uniform shell or housing so that when it is immersed in a fluid, non-uniform stresses are produced in a resonator section. Yet, the crystallographic orientation of the resonator section is selected so that frequency changes due to uniform radial stresses, such as those caused by temperature changes, and more particularly temperature transients, are substantially reduced. Since the pressures to be measured will now produce non-uniform stresses in the resonator section, causing the frequency of vibration of the resonator section to change, the pressures can be measured.

Figure 1:
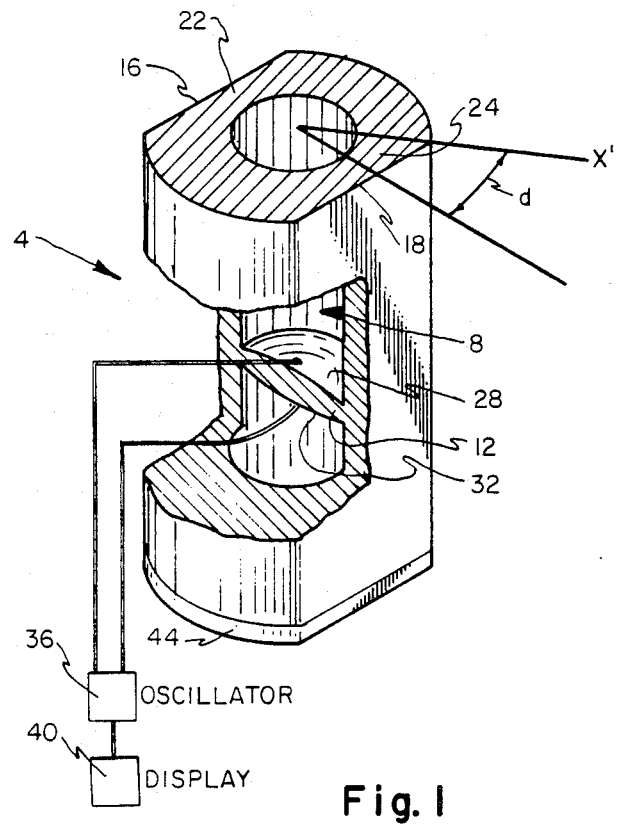
FIG. 1 shows a perspective, partially cut-away view of a resonator pressure transducer made in accordance with the principles of the present invention.

The figures of the drawings show four different shell or housing configurations which might be utilized. FIG. 1 shows a perspective, partially cut-away view of a generally cylindrical housing 4 having a cylindrical cavity 8. Disposed in the cavity 8 and integrally formed at its perimeter with the sidewalls of the housing is a disc-shaped resonator section 12. The sidewalls of the housing 4 circumscribe the resonator section 12 and extend in opposite directions generally normal to the plane of the resonator section. Advantageously, the housing 4 and resonator section 12 are integrally formed from quartz.

The exterior surface of the housing 4 is formed with two oppositely-facing flat sections 16 and 18 which result in two diametrically opposite portions 22 and 24 of the sidewalls being thinner than the remaining portions of the sidewalls. With this construction, when the housing 4 is immersed in a fluid, a non-uniform radial stress will be produced in the resonator section 12 because greater pressure will be transmitted through the thin sidewall portions 22 and 24 than through the remaining thicker portions.

To reduce the effects of temperature on the scale factor (frequency vs. pressure slope) of the resonator section 12, the diametric alignment of the flat sections 16 and 18 of the housing 4 is rotated through some angle d from the X' axis of the quartz material. For example, for SC-cut quartz, it has been found advantageous to select an angle d of about 45 degrees, whereas for rotated X-cut quartz, it has been found advantageous to select the angle d of about 70 to 100 degrees. The optimum angle for reducing the effects of temperature variation on the scale factor can be readily determined by experimentation for various cuts of quartz or other piezoelectric materials. This optimum angle depends, among other things, on the relative thinness of the flat sections, the number of flat sections and the stress patterns developed in the resonator section.

Selection of the appropriate piezoelectric material cut for the housing 4 and resonator section 12 will result in elimination of frequency shifts from uniform radial stresses in the resonator section 12, and thus, the elimination of frequency shift due to temperature transients.

Circuitry for causing the resonator section 12 to vibrate includes two electrodes 28 and 32 disposed (for example, by vacuum deposition) respectively on opposite surfaces of the resonator section, as shown in FIG. 1. The electrodes 28 and 32 are coupled to an oscillator 36 which produces an oscillatory signal for application to the electrodes to cause the resonator section 12 to vibrate in a well known manner. A display 40 is coupled to the oscillator to display the frequency of oscillation of the oscillator. As exterior pressure on the housing 4, and thus, on the resonator section 12, varies, the frequency of vibration of the resonator section changes and the oscillator 36 follows the frequency change to oscillate at the same frequency as the resonator section. Thus, changes in the frequency of vibration of the resonator section 12 can be detected and displayed to provide a measure of the pressure to which the housing 4 is subjected.

End caps, such as end cap 44, are placed at both ends of the housing 4 to seal the interior of the housing and prevent the entry of fluid whose pressure is being measured. Hereinafter, any reference to a "housing" shall be understood to mean an enclosed structure, such as that shown in FIG. 1 but including both end caps, capable of isolating the resonator section 12 from the exterior of the housing.

Figure 2:
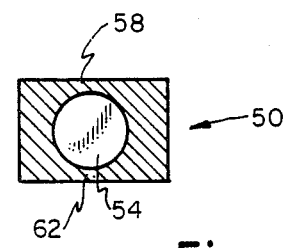
FIG. 2 is a top, cross-sectional view of an alternative embodiment of the transducer housing.

FIG. 2 shows a cross-sectional view of another embodiment of the apparatus of the present invention. In this embodiment, a housing 50 is formed to have a generally rectangular cross-section to surround a resonator section 54. Again, the housing includes two diametrically opposite walls 58 and 62 which are thinner than the remaining walls of the housing. Thus, non-uniform radial stresses would be produced in the resonator section 54 when the housing 50 is immersed in a fluid.

Figure 3:
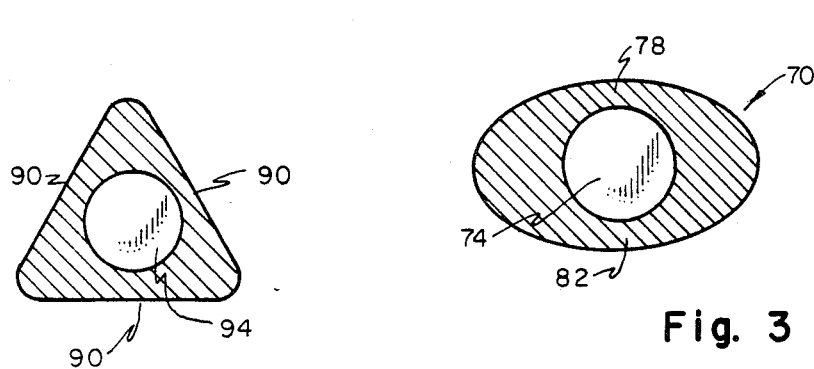
FIG. 3 is a top, cross-sectional view of still another embodiment of the transducer housing.

FIG. 3 shows still another embodiment of the present invention. In this embodiment, a housing 70 is formed to be generally elliptical in cross-section to surround a resonator section 74 and to include thin, diametrically opposite sidewalls 78 and 82.

Figure 4:
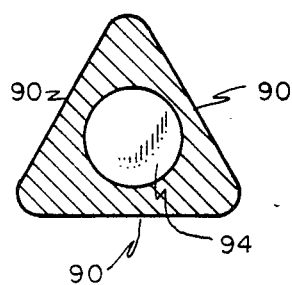
FIG. 4 is a top, cross-sectional view of a fourth embodiment of the transducer housing.

FIG. 4 shows a fourth embodiment of the invention which includes three thin wall sections 90 of a housing positioned symmetrically about a resonator section 94. Pressure on the side walls of the housing produces non-uniform radial stresses in the resonator section 94 which, in turn, affect the frequency of vibration of the resonator section and this enable accurate measurement of the pressure.

In the manner described, a simple, easy-to-construct resonator pressure transducer is provided. The transducer includes a generally disc-shaped resonator section whose periphery is joined to and surrounded by a housing having sidewalls which extend generally normal to the plane of the resonator section. A selected portion or portions of the sidewalls are made thinner than the remaining portions of the sidewalls so that non-uniform stresses (generally radially directed) are created in the resonator section when the housing is immersed in a fluid whose pressure is to be measured.

It is to be understood that the above-described arrangements are only illustrative of the application of the principles of the present invention. Numerous modifications and alternative arrangements may be devised by those skilled in the art without departing from the spirit and scope of the invention, and the appended claims are intended to cover such modifications and arrangements.

What is claimed is:

1. A resonator pressure transducer comprising:
    a generally disc-shaped resonator section;
    a housing surrounding the resonator section and joined to the perimeter thereof, said housing having sidewalls which extend generally normal to the plane of the resonator section, with selected portions of the sidewalls being thinner than the remaining portions of the sidewalls so that when the housing is immersed in a fluid, a non-uniform stress is produced in the resonator section; and means for causing said resonator section to vibrate, with the frequency of vibration varying with variation in pressure applied to the housing sidewalls.

2. A transducer as in claim 1 wherein said resonator section is integral with the sidewalls of the housing.

3. A transducer as in claim 1 wherein said resonator section is formed of crystalline quartz so that the frequency of vibration is substantially independent of temperature transients.

4. A transducer as in claim 3 wherein said resonator section is SC-cut quartz.

5. A transducer as in claim 4 wherein the thinner sidewall portions are diametrically opposite one another.

6. A transducer as in claim 1 wherein said resonator section is formed of crystalline quartz so that the frequency of vibration is substantially independent of temperature variations.

7. A transducer as in claim 6 wherein said resonator section is AT-cut quartz.

8. A transducer as in claim 6 wherein said resonator section is BT-cut quartz.

9. A transducer as in claim 1 wherein said housing is generally cylindrical, with the diametrically opposite sidewall portions being formed with flats or chord cuts on the exterior surface thereof.

10. A transducer as in claim 1 wherein the cross-section of the housing is generally rectangular.

11. A transducer as in claim 1 wherein the cross-section of the housing is generally elliptical.

12. A transducer as in claim 1 wherein the housing includes three generally equally-spaced apart thinner sidewall portions.

13. Pressure detection apparatus comprising:
a generally disc-shaped quartz crystal resonator section adapted to vibrate in response to an oscillatory signal, with the frequency of vibration varying with variation in force applied at the perimeter of the resonator section;

a housing having sidewalls joined to the perimeter of the resonator section to circumscribe the section and extend in opposite directions normal to the plane of the resonator section, wherein selected portions of the sidewalls are thinner than the remaining portions; and means for supplying an oscillatory signal to said resonator section to cause the section to vibrate.

14. Apparatus as in claim 13 wherein said resonator section is fabricated from quartz so that the frequency of vibration is substantially independent of temperature transients, wherein the selected portions comprise two diametrically opposite sidewalls, and wherein the alignment of the diametrically opposite side walls is rotated from the X' axis of the quartz by an angle d.

15. Apparatus as in claim 13 wherein said housing is generally cylindrical with oppositely-facing flat sections formed coincident with the thinner walls.

16. Apparatus as in claim 13 wherein the cross-section of the housing is generally rectangular, with the long dimension sides of the cross-section being coincident with the thinner walls.

17. Apparatus as in claim 13 wherein the cross-section of the housing is generally elliptical, with the long dimension sides of the cross-section being coincident with the thinner walls.

18. Apparatus as in claim 13 wherein the resonator section is integral with the sidewalls of the housing.

19. A resonator pressure transducer comprising:
a generally disc-shaped resonator section;
a housing surrounding the resonator section and joined to the perimeter thereof, said housing having sidewalls which extend generally normal to the plane of the resonator, with at least one portion of the sidewalls being thinner than the remaining portions so that when the housing is immersed in a fluid, a non-uniform stress is produced in the resonator section; and means for causing said resonator section to vibrate, with the frequency of vibration varying with variation in pressure applied to the housing sidewalls.

* * * * *